Patented Oct. 13, 1953

2,655,446

UNITED STATES PATENT OFFICE 2,655,446

CHEMICAL COMPOSITIONS AND METHODS

Charles W. Todd, Wilmington, Del., assignor to E. I. du Pont de Nemours & Company, Wilmington, Del., a corporation of Delaware No Drawing. Application February 14, 1952, Serial No. 271,633

3 Claims. (Cl. 71—2.6)

This invention relates to methods for killing weeds, or undesirable plant growth, and to compositions employed in practicing such methods.

This application is a continuation-in-part of my copending applications: Serial No. 131,498 filed December 6, 1949, Serial No. 186,118 filed September 21, 1950, Serial No. 231,061 filed June 11, 1951, and Serial No. 231,062 filed June 11, 1951 all of which are now abandoned except application Serial No. 186,118.

The herbicidally active compounds of the invention are substituted ureas represented by the formula:

(1) 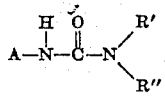

where R' is an alkyl radical having up to two carbon atoms and R'' is an alkyl radical up to four carbon atoms when R' is methyl and up to two carbon atoms when R' is ethyl, and A is an ortho-substituted phenyl group selected from

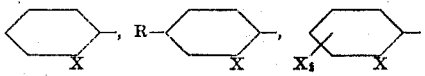

and

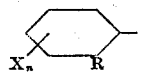

where X is halogen, $n$ is a positive integer up to 2, and R is alkyl having up to four carbon atoms, the ortho-substituted phenyl group having one hydrogen on one of the nuclear carbons ortho to the group —NHCON(R')R''.

It will be seen that the herbicidally active compounds of the invention are especially characterized by having a single substituent ortho to the -NHCON(R')R'' group. In other words, they are mono-ortho substituted. Further, the only substituents on the phenyl ring are either lower alkyl or halogen. An additional class characteristic of the compound is that they are all tri-substituted ureas, the aromatic group being the only substituent of the urea nitrogen atom to which it is bonded.

R, R' and R'' in the above Formula 1 and in the description following that formula are preferably methyl and X is preferably chlorine.

The herbicidally active compounds of the invention are prepared by the reaction of an appropriate ortho substituted phenyl isocyanate with a dialkyl amine. The following equation showing specific reactants illustrates the reaction:

(2) 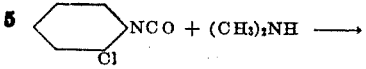

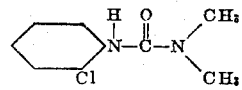

The amine-isocyanate reaction is most readily carried out in the presence of an inert solvent, such as, toluene, anisole, benzene, chlorobenzone, or dioxane. No catalyst is needed, and since the reaction is exothermic it is ordinarily unnecessary to supply heat. Thus the reaction is conveniently carried out by first mixing the isocyanate with the inert solvent at room temperature and then gradually adding the secondary amine reactant while permitting the temperature to increase thru the range of say 25 to 75° C. The tri-substituted urea products are generally quite insoluble in the solvent used and, therefore, precipitate out as formed and are readily separated from the reaction mass.

The ortho substituted phenyl dialkyl ureas of the invention are, for the most part, white crystalline solids. They are insoluble or only slightly soluble in water and cold benzene and, in general, appreciably soluble in dioxane, acetone, ethyl acetate, ethanol, and hot benzene.

The ortho substituted phenyl isocyanates used as starting materials can be prepared by the general method described in the literature (Vittenet, Bull., Soc. Chim. (3) 21, 586, 954 (1899); Organic Synthesis, Collective, vol. II, page 453; and U. S. Patent 2,428,843) which consists in heating the haloaryl carbamyl chloride first obtained by treating the haloaryl primary amine with phosgene at ordinary temperature in the presence of an appropriate solvent or reaction media.

Illustrative of the herbicidally active compounds of the invention represented by Formula 1 above are:

3 - (o - chlorophenyl) - 1,1 - diethylurea
3 - (o - chlorophenyl) - 1,1 - dimethylurea
3 - (o - chlorophenyl) - 1 - methyl - 1 - isopropylurea
3 - (o - chlorophenyl) - 1 - methyl - 1 - n - propylurea
3 - (2,4,5, trichlorophenyl) - 1 - methyl - 1 - isobutylurea 3 - (2 - methyl - 4 - chlorophenyl) - 1,1 - dimethylurea
3 - (2 - methyl - 5 - chlorophenyl) - 1,1 - dimethylurea
3 - (2 - methyl - 3,5 - dichlorophenyl) - 1,1 - dimethylurea
3 - (o - chlorophenyl) - 1 - methyl - 1 - ethylurea
3 - (2 - chloro - p - tolyl) - 1 - methyl - 1 - isopropylurea
3 - (2 - chloro - p - tolyl) - 1 - methyl - 1 - sec. butylurea
3 - (2 - chloro - 4 - ethylphenyl) - 1,1 - dimethylurea
3 - (2,3,5, trichlorophenyl) - 1,1 - dimethylurea
3 - (2,4,5, trichlorophenyl) - 1 - methyl - 1 - ethylurea
3 - (2,4,5, trichlorophenyl) - 1 - methyl - 1 - isopropylurea
3 - (o - chlorophenyl) - 1 - methyl - 1 - sec. butylurea
3 - (o - chlorophenyl) - 1 - methyl - 1 - isobutylurea
3 - (o - chlorophenyl) - 1 - methyl - 1 - tert. butylurea
3 - (o - chlorophenyl) - 1 - methyl - 1 - n - butylurea
3 - (2 - methyl - 4 - chloro) - 1 - methyl - 1 - sec. butylurea
3 - (2 - ethyl - 4 - chlorophenyl) - 1,1 - dimethylurea
3 - (2 - sec. butyl - 4 - chlorophenyl) - 1,1 - dimethylurea
3 - (2 - chloro - 4 - sec. butylphenyl) - 1,1 - diethylurea
3 - (2 - bromo - p - tolyl) - 1,1 - dimethylurea
3 - (2,4 - dichloro - 5 - fluorophenyl) - 1,1 dimethylurea
3 - (2,4,5, trichlorophenyl) - 1,1 - dimethylurea
3 - (o-bromophenyl) - 1,1 - dimethylurea
3 - (2 - chloro - p - tolyl) - 1,1 - dimethylurea
3 - (2 - chloro - p - tolyl) - 1 - methyl - 1 - ethylurea
3 - (2 - methyl - 4,5 - dichlorophenyl) - 1,1 - dimethylurea
3 - (2 - methyl - 4 - chlorophenyl) - 1 - methyl-1-ethylurea
3 - (2 - methyl - 4 - chlorophenyl) - 1 - methyl-1 - n - propylurea For application of the herbicidally active compounds of the invention, the compounds are preferably admixed with a carrier material or conditioning agent of the kind used and referred to in the art as a pest control adjuvant or modifier in order to provide formulations adapted for ready and efficient application to weeds or unwanted plants using conventional applicator equipment.

Thus, one or more of the herbicidally active compounds of the invention are admixed with carrier or adjuvant materials to provide formulations in liquid or solid form. For example, solutions of the compounds of the invention in organic solvents, such as cyclohexanol, furfural, acetone, isobutanol, ethanol, isopropylacetate, and the like can be applied directly as herbicides. More economical and practical formulations are prepared by admixing or dispersing the herbicidally active compounds with a non-solvent carrier which may be either solid or liquid.

Thus, herbicidal dust compositions are compounded to give homogeneous free-flowing dust by admixing the active compounds with finely divided solids, preferably, talcs, natural clays, pyrophyllite, diatomaceous earth, and flours such as walnut shell, wheat, redwood, soya bean, and cottonseed flours. Other inert solid carriers which can be used to prepare the herbicidal formulations include magnesium and calcium carbonates, calcium phosphate, sulfur, lime, etc. either in powder or granular form. The percentage by weight of the essential active ingredients will vary according to the manner in which the composition is to be applied but, in general, will be 0.5 to 95% by weight of the herbicidal composition.

Liquid herbicidal compositions can contain, for example, one of the active herbicidal compounds of the invention dispersed in water or other non-solvent carrier. To secure such homogeneous dispersions, a surface-active agent is used. In fact, the preferred herbicidal compositions of this invention whether in liquid or in solid form contain the herbicidally active compound homogeneously admixed with a surface-active agent sometimes referred to in the art as wetting, dispersing or penetrating agents. These agents, which will be referred to hereinafter more simply as surface-active dispersing agents, cause the compositions to be easily dispersed in water to give aqueous sprays which, for the most part, constitute a desirable method of application.

The surface-active dispersing agents employed can be of the anionic, cationic or nonionic type and include, for example, sodium and potassium oleates, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and octylphenol, polyvinyl alcohols, salts, such as the acetate of polyamines from reductive amination of ethylene/carbon monoxide polymers, laurylamine hydrochloride, laurylpyridinium bromide, stearyltrimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually the minimum lower concentration will be 0.1%.

The herbicidal compositions of the invention can also have incorporated therein oils, fats or similar vehicles such as cottonseed oil, olive oil, lard, paraffin oil, hydrogenated vegetable oils, etc. Adhesives such as gelatin, blood albumin, resins, for example, rosin, alkyd resins and the like, can also be used in certain compositions to increase retention or tenacity of deposits following application.

Water-dispersible liquid compositions can be prepared by incorporating with the ureas and surface-active dispersing agents various organic liquids such as furfural, methanol, isopropanol, isobutanol, xylol, cresol, cyclohexanone, acetone, methyl ethyl ketone, kerosene, trichloroethylene, dimethylformamide, dimethylacetamide, alkylated naphthalenes, and the like. Such compositions are readily dispersible in water and provide excellent aqueous herbicidal sprays for field applications. The proportion of surface-active dispersing agent to urea can be 0.1 to 100% by weight in these water-dispersible herbicidal compositions.

The herbicidal compositions are applied either as a spray or a dust to the locus or area to be protected from undesirable plant growth, commonly called weeds, i. e., plants growing where they are not wanted. Such application is preferably made directly upon the foliage of the weed during the period of weed infestation. In order to destroy the weeds most of the compositions are preferably applied as aqueous foliar sprays. Alternatively, the dry powdered compositions can be dusted directly on the plants.

The active ingredients are, of course, applied in amount sufficient to exert the desired herbicidal action. The amount of herbicidally active compounds present in the compositions as actually applied for destroying weeds will vary with the herbicidal activity of the active ingredients, the purpose for which the application is being made, the manner of application, the particular weeds for which control is sought, and like variables. Certain of the specific examples to follow will illustrate various kinds and amounts of application and the results obtained thereby. In general, the herbicidal compositions as applied in the form of a spray or a dust will contain from about 0.02% to 95% by weight of herbicidally active ingredient.

The class of herbicidally active compounds of this invention has characteristics which make the compounds especially valuable for certain herbicidal uses. They are useful in destroying weeds in growing row crops by treatment of the weeds between the rows. They are particularly useful as contact herbicides for the control of annual weeds.

The solid and liquid compositions described and employed herein for application of the essential active herbicidal ingredient all have the common property of permitting application of the herbicidal compositions through suitable jets, nozzles, or spreaders adapted to the handling of granular materials onto the plants being treated and will, for convenience, be designated as "fluent carriers." The fluent carriers with which this invention is primarily concerned are non-solvent fluent carriers.

In order that the invention may be better understood, the following examples are given in addition to the examples already given above. The examples illustrate typical compounds of the invention, methods for their preparation, herbicidal formulations employing such compounds, herbicidal applications, and the results obtained.

EXAMPLE 1

*3-(o-chlorophenyl)-1,1-diethylurea* o-Chlorophenyl isocyanate (30.6 parts) was added dropwise to a solution of 16 parts of diethylamine and 258 parts of dry dioxane with stirring. Heat was liberated on contact of the reactants and the temperature was maintained at 25–35° C. On pouring the reaction mixture into 500 parts of water, a light-colored oil separated. This oil was extracted with diethyl ether, and the ether extract was then dried over anhydrous magnesium sulfate. Distillation yielded a fraction (37 parts) of 3-(o-chlorophenyl)-1,1-diethylurea boiling at 137–139° C./0.5 mm.

Anal. calc'd. for $C_{11}H_{15}ClN_2O$: C, 58.35; H, 6.67. Found: C, 58.19; H, 6.86.

EXAMPLE 2

*3-(2,4,5-trichlorophenyl)1,1-dimethylurea*

A solution of 16 parts by weight of 2,4,5-trichloroaniline in 75 parts by weight of anisole was treated with 10 parts by weight of phosgene and heated until the resulting mixture was a clear solution. The solution was cooled to 25° C. and 4.3 parts by weight of dimethylamine was added with stirring. The mixture was then heated at the reflux temperature for 15 minutes. On cooling 12 parts by weight of 3-(2,4,5-trichlorophenyl)-1,1-dimethylurea separated as a white crystalline product; M. P. 111–2° C., yield 55%.

Anal. calc'd. for $C_9H_9Cl_3N_2O$: Cl, 39.33. Found: Cl, 39.13, 39.42.

EXAMPLE 3

*3-(o-chlorophenyl)-1,1 dimethylurea*

Dimethylamine was passed into a solution of 46.1 parts by weight of o-chlorophenyl isocyanate in 110 parts by weight of absolute ether until present in excess. The reaction mixture was heated to reflux for 10 minutes, cooled, and white crystalline 3-(o-chlorophenyl)-1,1 dimethylurea precipitated and was separated and dried in a vacuum oven at 50° C. over phosphoric anhydride. The yield was 53.1 parts by weight (89%) M. P. 94.1–5.4° C.

Anal. calc'd. for $C_9H_{11}ClN_2O$: Cl, 17.87. Found: Cl, 17.90, 17.95.

Additional herbicidal reactive compounds of the invention such as those tabulated previously are similarly prepared according to the methods described in the foregoing detailed examples.

EXAMPLE 4

*Dust formulations*

The following compositions are adapted for direct application as dusts for the destruction of weeds using conventional dusting equipment. The dusts are made by blending or mixing the ingredients and grinding the mix to give compositions having an average particle size less than about 50 microns.

A

| | |
|---|---:|
| 3-(2-methyl-4-chlorophenyl)-1-methyl-1-isopropylurea | 20 |
| Talc | 80 |
| | 100 |

B

| | |
|---|---:|
| 3-(2-chloro-4-sec. butylphenyl)1,1-dimethylurea | 5 |
| Cottonseed oil | 4 |
| Walnut shell flour | 91 |
| | 100 |

EXAMPLE 5

*Water-dispersible powders*

The following powdered compositions are adapted for dispersing in water for application as a spray for the destruction of weeds. The powdered compositions are made by intimately mixing the listed ingredients using conventional mixing or blending equipment and then grinding the mixture to give a powder having an average particle size less than about 50 microns.

A

| | |
|---|---|
| 3-(o-chlorophenyl)-1,1-dimethylurea | 75 |
| Fuller's earth | 23.75 |
| Sodium lauryl sulfate, 50% (wetting agent) | 1 |
| Methyl cellulose, 15 cps. (dispersing agent) | 0.25 |
| | 100 |

B

| | |
|---|---|
| 3-(2,4,5-trichlorophenyl)-1,1-dimethylurea | 80 |
| Sodium disulfonate of dibutyl phenylphenol (wetting and dispersing agent) | 2 |
| Bentonite | 18 |
| | 100 |

EXAMPLE 6

Oil-water dispersible powders

The following powdered compositions are adapted for use in the preparation of spray compositions using either an oil, water, or a combination of oil and water as the liquid diluent. The powders are made by mixing and grinding as in the case of the powders of Example 4.

A

| | |
|---|---|
| 3-(2,4,5-trichlorophenyl)-1-methyl-1 sec.-butylurea | 70 |
| Alkylated aryl polyether alcohol (wetting and dispersing agent) | 4 |
| Fuller's earth | 26 |
| | 100 |

B

| | |
|---|---|
| 3-(2-chloro-p-tolyl)-1-methyl-1-ethylurea | 80 |
| Ethylene oxide stearate-laurate (emulsifying agent) | 4 |
| Pyrophyllite | 16 |
| | 100 |

EXAMPLE 7

Water-dispersible liquid compositions

The following compositions are in a liquid form and are adapted for addition to water to give aqueous dispersions for application as sprays. The urea herbicides are generally quite insoluble in most oils. Therefore, the liquid compositions ordinarily are not complete solutions but rather are dispersions of solid in an oil. The liquid or fluid compositions shown are prepared by thoroughly mixing and dispersing the active compounds and conditioning agent or agents in an organic liquid diluent.

A

| | |
|---|---|
| 3-(o-chlorophenyl)-1-methyl-1-sec.-butylurea | 25 |
| Long chain fatty alcohol sulfate (emulsifying agent) | 2 |
| Goulac (dispersing agent) | 3 |
| Kerosene | 70 |
| | 100 |

B

| | |
|---|---|
| 3-(2-chloro-4-ethylphenyl)-1-diethylurea | 30 |
| Alkylated aryl polyether alcohol (wetting and emulsifying agent) | 3 |
| Methyl cellulose (dispersing agent) | 1 |
| Kerosene | 66 |
| | 100 |

EXAMPLE 8

The compositions of this invention are effective herbicides when applied to foliage. For example, 3-(2,4,5-trichlorophenyl)-1,1-dimethylurea was formulated to give a composition containing 80% by weight of that compound, 18% by weight of powdered solid diluent and 2% by weight of wetting and dispersing agents. This formulation was dispersed in water to give aqueous spray compositions containing various concentrations of the active compound. Each aqueous dispersion was sprayed on three month old quack grass plants from root cuttings to the run-off point. An aqueous dispersion containing 0.5% of the 3-(2,4,5-trichlorophenyl)-1,1-dimethylurea was sufficient to effect kill of the quack grass in three months.

I claim:

1. A method for killing weeds which comprises applying to the weeds, in amount sufficient to exert a herbicidal action, a 3-(o-substituted phenyl)-1,1-dialkylurea represented by the formula:

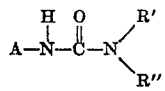

where R' is an alkyl radical having up to two carbon atoms, R'' is an alkyl radical up to four carbon atoms when R' is methyl and up to two carbon atoms when R' is ethyl, and A is an ortho-substituted phenyl group selected from the group consisting of

and

where X is halogen, $n$ is a positive integer up to 2, and R is alkyl having up to four carbon atoms, the ortho-substituted phenyl group having one hydrogen on one of the nuclear carbons ortho to the group —NHCON(R')R''.

2. A composition suitable for destroying weeds comprising a carrier material and, in amounts sufficient to exert herbicidal action, a 3-(o-substituted phenyl)-1,1-dialkylurea represented by the formula:

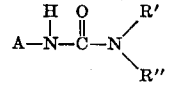

where R' is an alkyl radical having up to two carbon atoms, R'' is an alkyl radical up to four carbon atoms when R' is methyl and up to two carbon atoms when R' is ethyl, and A is an ortho-substituted phenyl group selected from the group consisting of

and

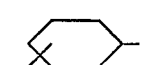

where X is halogen, $n$ is a positive integer up to 2, and R is alkyl having up to four carbon atoms, the ortho-substituted phenyl group having one hydrogen on one of the nuclear carbons ortho to the group —NHCON(R')R''.

3. A herbicidally active 3-(o-substituted phenyl)-1,1-dialkylurea represented by the formula

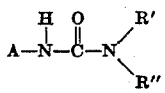

where R' is an alkyl radical having up to two carbon atoms and R'' is an alkyl radical up to four carbon atoms when R' is methyl and up to two carbon atoms when R' is ethyl, and A is an ortho-substituted phenyl group selected from the group consisting of

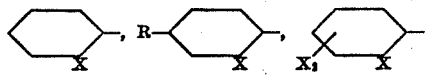

and

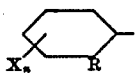

where X is halogen, $n$ is a positive integer up to 2, and R is alkyl having up to four carbon atoms, the ortho-substituted phenyl group having one hydrogen on one of the nuclear carbons ortho to the group —NHCON(R')R''.

CHARLES W. TODD.

References Cited in the file of this patent

UNITED STATES PATENTS

| Number | Name | Date |
|---|---|---|
| 2,029,959 | Urbain | Feb. 4, 1936 |
| 2,210,442 | Balle et al. | Aug. 6, 1940 |
| 2,280,756 | Sankaitis | Apr. 21, 1942 |
| 2,322,761 | Lontz | June 29, 1943 |
| 2,341,868 | Hitchcock et al. | Feb. 15, 1944 |
| 2,374,485 | Haury | Apr. 24, 1945 |
| 2,412,510 | Jones | Dec. 10, 1946 |
| 2,472,347 | Sexton | June 7, 1949 |

FOREIGN PATENTS

| Number | Country | Date |
|---|---|---|
| 574,995 | Great Britain | Jan. 30, 1946 |

OTHER REFERENCES

Thompson et al., "Botanical Gazette," vol. 107 (1949), pp. 494 and 498.

Hunter, "J. Chem. Soc." (London), 1927, pp. 1209 to 1213.